United States Patent
Suzuki et al.

(10) Patent No.: US 6,734,274 B2
(45) Date of Patent: May 11, 2004

(54) URETHANE COMPOSITION FOR SHEET TRANSPORT ROLL, AND SHEET TRANSPORT ROLL PRODUCED BY EMPLOYING THE URETHANE COMPOSITION

(75) Inventors: Satoshi Suzuki, Aichi-ken (JP); Hitoshi Yoshikawa, Aichi-ken (JP); Yoshihiro Wago, Gifu-ken (JP); Keita Shiraki, Aichi-ken (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/940,787

(22) Filed: Aug. 29, 2001

(65) Prior Publication Data

US 2002/0049297 A1 Apr. 25, 2002

(30) Foreign Application Priority Data

Aug. 29, 2000 (JP) ........................................ 2000-259730
May 31, 2001 (JP) ........................................ 2001-164551

(51) Int. Cl.$^7$ .......................... C08G 18/48; B65H 5/06; B65H 27/00
(52) U.S. Cl. ........................ 528/76; 399/361; 399/379; 399/381; 399/411
(58) Field of Search .......................... 528/76; 399/361, 399/379, 381, 411

(56) References Cited

U.S. PATENT DOCUMENTS

| | | | |
|---|---|---|---|
| 3,963,681 A | 6/1976 | Kaneko et al. | ................ 528/61 |
| 3,980,606 A | 9/1976 | Werner | ........................ 524/775 |
| 5,691,441 A | 11/1997 | Seneker et al. | ................ 528/61 |

FOREIGN PATENT DOCUMENTS

| | | |
|---|---|---|
| EP | 0565237 A1 | 10/1993 |
| GB | 1044040 | 9/1966 |
| JP | 62-136469 | 6/1987 |
| JP | 63-077919 | 4/1988 |
| JP | 05-125142 | 5/1993 |
| JP | 09-012192 | 1/1997 |

*Primary Examiner*—Rabon Sergent
(74) *Attorney, Agent, or Firm*—Armstrong, Kratz, Quintos, Hanson & Brooks, LLP

(57) ABSTRACT

A urethane composition for making a sheet transport roll, the composition comprising: (A) a polyether polyol blend containing polytetramethyleneether glycol (PTMG) and polypropylene glycol (PPG) in a weight ratio of PTMG/PPG=99/1 to 50/50; (B) a polyisocyanate; and (C) a chain lengthening agent; the urethane composition in a cured state having a hardness of not smaller than 40, and a crosslinking density of 0.15 to 0.8 mmol/cm$^3$ or an allophanate bond concentration of 0.03 to 0.07 mmol/g.

17 Claims, 1 Drawing Sheet

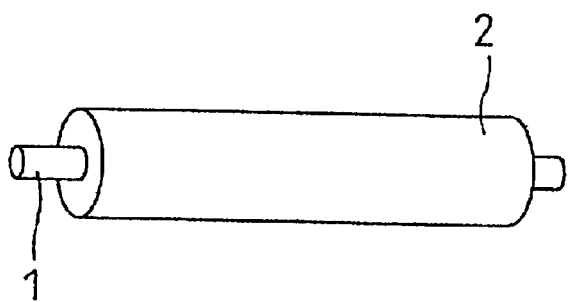
FIGURE

URETHANE COMPOSITION FOR SHEET TRANSPORT ROLL, AND SHEET TRANSPORT ROLL PRODUCED BY EMPLOYING THE URETHANE COMPOSITION

BACKGROUND OF THE INVENTION

1. Field of the Invention

The present invention relates to a urethane composition for preparing a sheet transport roll, and to a sheet transport roll produced by employing such a urethane composition.

2. Description of the Art

Sheet transport rolls such as sheet feed rolls and transportation rolls for use in copying machines are generally required to have a high friction coefficient, a high abrasion resistance, and a high compression resistance. From the viewpoint of the abrasion resistance, a urethane roll composed of a polyurethane material is conventionally employed as the sheet transport roll. The urethane roll is generally excellent in abrasion resistance, but has a lower friction coefficient than a rubber roll. Therefore, the hardness of the urethane roll is reduced by adding a plasticizer to the polyurethane material or by reducing the NCO index of the polyurethane material to so as to increase the friction coefficient (Japanese Unexamined Patent Publication No. 63-77919 (1988)).

However, the urethane roll disclosed in Japanese Unexamined Patent Publication No. 63-77919 has an unsatisfactory friction coefficient. That is, it is impossible to provide a sufficiently high friction coefficient which is virtually equivalent to that of the rubber roll. If the hardness of the urethane roll is reduced to lower than 40, the urethane roll has an increased adhesion, so that paper dust is liable to adhere on the surface of the roll. This disadvantageously reduces the friction coefficient. If the NCO index is reduced, the crosslinking density is reduced, thereby disadvantageously deteriorating the compression resistance and the abrasion resistance.

In view of the foregoing, it is an object of the present invention to provide a urethane composition for a sheet transport roll which allows the sheet transport roll to have a high friction coefficient and an excellent abrasion resistance while maintaining the friction coefficient at a high level. It is another object of the invention to provide a sheet transport roll produced by employing such a urethane composition.

SUMMARY OF THE INVENTION

In accordance with a first aspect of the present invention to achieve the aforesaid object, there is provided a urethane composition for a sheet transport roll, the composition comprising: (A) a polyetherpolyol blend containing polytetramethyleneether glycol (PTMG) and polypropylene glycol (PPG) in a weight ratio of PTMG/PPG=99/1 to 50/50; (B) a polyisocyanate; and (C) a chain lengthening agent; the urethane composition in a cured state having a hardness of not smaller than 40, and a crosslinking density of 0.15 to 0.8 mmol/cm$^3$ or an allophanate bond concentration of 0.03 to 0.07 mmol/g.

In accordance with a second aspect of the present invention, there is provided a sheet transport roll produced by employing the urethane composition according to the first aspect.

The inventors of the present invention have conducted intensive studies on polyol materials to provide a urethane composition for a sheet transport roll which has a high friction coefficient and an excellent abrasion resistance. Particularly, the studies have been directed to ether-type polyols, revealing that the specific polyether polyol blend (component (A)) containing PTMG (which has a high strength among other ether-type polyols) and PPG in a predetermined weight ratio provides favorable results. It has been noted that ester-type polyols fail to provide favorable results because the ester-type polyols are generally poor in hydrolysis resistance with ester bonds present in their molecular structures. The inventors have further conducted studies on the properties of the above urethane composition comprising the polyether polyol blend (component (A)), the polyisocyanate (component (B)) and the chain lengthening agent (component (C)) and, as a result, have found that the aforesaid object can be achieved by controlling the hardness and the crosslinking density or the allophanate bond concentration of the urethane composition in the cured state in the aforesaid predetermined ranges. Thus, the present invention has been attained.

The term "sheet transport roll" herein includes a sheet feed roll (such as a pick-up roll, a feed roll or a retard roll) or a sheet transport roll (such as a transport roll) in a narrower sense, and further is intended to include a sheet transport belt and the like.

When the urethane composition includes an ion conductive agent in addition to the polyether polyol blend (component (A)), the polyisocyanate (component (B)) and the chain lengthening agent (component (C)), the ion conductive agent serves as an anti-static agent, so that paper dust can more effectively be prevented from adhering on a roll surface and the friction coefficient of the roll can more effectively be maintained at a high level.

When the urethane composition comprises a plasticizer and/or a hollow filler in addition to the components (A) to (C), the friction efficient advantageously can be increased.

BRIEF DESCRIPTION OF THE DRAWING

The sole FIGURE of the drawing is a sectional view illustrating an exemplary sheet transport roll.

DETAILED DESCRIPTION OF THE INVENTION

The present invention will hereinafter be described by way of embodiments thereof.

A urethane composition for a sheet transport roll according to the present invention is prepared by blending a specific polyether polyol blend (component (A)), a polyisocyanate (component (B)) and a chain lengthening agent (component (C)).

The specific polyether polyol blend (component (A)) is prepared by blending polytetramethyleneether glycol (PTMG) and polypropylene glycol (PPG) in a predetermined weight ratio.

The weight ratio between polytetramethyleneether glycol (PTMG) and polypropylene glycol (PPG) is in the range of PTMG/PPG=99/1 to 50/50, preferably PTMG/PPG=90/10 to 60/40. If the weight ratio of PPG is smaller than 1, it generally is not be possible to provide a high friction coefficient. If the weight ratio of PPG is greater than 50, the abrasion resistance tends to be deteriorated.

The polytetramethyleneether glycol (PTMG) typically has a number average molecular weight (Mn) of 1000 to 3000, preferably 1500 to 2500. The polypropylene glycol (PPG) typically has a number average molecular weight (Mn) of 1000 to 3000, preferably 1500 to 2500.

The polyisocyanate (component (B)) to be employed along with the polyether polyol blend (component (A)) is not particularly limited, but may be any of those polyisocyanates typically used for preparation of common urethane compositions. Examples of suitable polyisocyanate include diisocyanates such as 4,4'-diphenylmethane diisocyanate (MDI), 2,4-tolylene diisocyanate (2,4-TDI), 2,6-tolylene diisocyanate (2,6-TDI), 3,3-bitolylene-4,4-diisocyanate, 3,3'-dimethyldiphenylmethane-4,4'-diisocyanate, 2,4-tolylene diisocyanate uretidinedione (dimer of 2,4-TDI), 1,5-naphthylene diisocyanate, m-phenylene diisocyanate, hexamethylene diisocyanate, isophorone diisocyanate (IPDI), 4,4'-dicyclohexylmethane diisocyanate (hydrogenated MDI), carbodiimide-modified MDI, o-toluidinediisocyanate, xylene diisocyanate, p-phenylene diisocyanate and lysine diisocyanate methyl ester; triisocyanates such as triphenylmethane-4,4',4"-triisocyanate; and polymeric MDI. These polyisocyanates may be used either alone or in combination. Among these polyisocyanates, MDI is particularly preferred in terms of the resultant abrasion resistance for the urethane composition.

The ratio between the number of moles (a) of hydroxyl groups in the polyether polyol blend (component(A)) and the number of moles (b) of isocyanate groups in the polyisocyanate (component (B)) is preferably a/b=1.0/1.5 to 1.0/3.5.

The chain lengthening agent (component (C)) to be employed along with the polyether polyol blend (component (A)) and the polyisocyanate (component (B)) is not particularly limited, but may be any of those agents typically employed for the preparation of common urethane compositions. Examples of the chain lengthening agent include polyols such as 1,4-butanediol (1,4-BD), ethylene glycol, diethylene glycol, propylene glycol, dipropylene glycol, hexanediol, 1,4-cyclohexanediol, 1,4-cyclohexanedimethanol, xylene glycol, triethylene glycol, trimethylolpropane (TMP), glycerol, pentaerythritol, sorbitol and 1,2,6-hexanetriol, which have molecular weights of not higher than 300. These may be used either alone or in combination. Among these chain lengthening agents, 1,4-butanediol (1,4-BD) and trimethylolpropane (TMP) are particularly preferred in terms of the resultant abrasion resistance and the compression resistance for the urethane composition.

The chain lengthening agent (component (C)) is blended in the urethane composition, preferably in a proportion such that the ratio between the number of moles (u) of isocyanate groups in a specific urethane prepolymer containing the specific polyether polyol blend (component (A)) and the polyisocyanate (component (B)) (hereinafter referred to simply as "urethane prepolymer") and the number of moles (c) of hydroxyl groups in the chain lengthening agent (component (C)) is u/c=100/75 to 100/105, particularly preferably u/c=100/85 to 100/95. If the ratio of the number of the moles (c) of the hydroxyl groups in the chain lengthening agent (component (C)) is smaller than 75, the resulting urethane composition tends to have an extremely high hardness and a reduced friction coefficient. If the ratio of the number of the moles (c) of the hydroxyl groups in the chain lengthening agent (component (C)) is greater than 105, the resulting urethane composition tends to have a reduced crosslinking density and a deteriorated abrasion resistance.

The urethane composition according to the present invention preferably contains one or more additives such as an ion conductive agent, a plasticizer, a hollow filler and/or the like in addition to the components (A) to (C). These additives may be used either alone or in combination.

Examples of the ion conductive agent include ammonium salts such as perchlorates, chlorates, chlorides, bromates, iodates, borofluorates, sulfates, alkylsulfates, carboxylates and sulfonates of tetraethyl ammonium, tetrabutyl ammonium, dodecyltrimethyl ammonium (lauryltrimethyl ammonium and the like), octadecyltrimethyl ammonium (stearyltrimethyl ammonium and the like), hexadecyltrimethyl ammonium, benzyltrimethyl ammonium and modified aliphatic dimethylethyl ammonium; and perchlorates, chlorates, chlorides, bromates, iodates, borofluorates, trifluoromethylsulfates and sulfonates of alkali metals and alkaline earth metals such as lithium, sodium, calcium and magnesium. These ion conductive agents may be used either alone or in combination. Among these ion conductive agents, quaternary ammonium alkylsulfates and quaternary ammonium polybasic carboxylates are particularly preferred because any increase in electric resistance thereof during continuous energization is relatively small. Borate compounds may also be used as the ion conductive agent.

The ion conductive agent preferably is blended in a proportion of not greater than 3 parts by weight (hereinafter referred to simply as "parts"), particularly preferably 0.1 to 3 parts, based on 100 parts of the urethane prepolymer.

Examples of the plasticizer to be employed in the compositions of the present invention include phthalic acid derivatives such as dioctyl phthalate (DOP), sebacic acid derivatives such as dioctyl sebacate (DOS), adipic acid derivatives such as dibutyldiglycol adipate (BXA) and dibutylcarbitol adipate, phosphoric acid derivatives such as tributyl phosphate (TBP), tributoxyethyl phosphate (TBXP), trioctyl phosphate (TOP) and triphenyl phosphate (TPP), polyester derivatives, polyether ester derivatives, and polyether derivatives. These plasticizers may be used either alone or in combination. Among these plasticizers, DOP is particularly preferred in terms of compatibility.

The plasticizer is preferably blended in a proportion of not greater than 50 parts, particularly preferably 10 to 50 parts based on 100 parts of the urethane prepolymer to optimize the friction coefficient and the abrasion resistance.

Examples of the hollow filler to be employed in the compositions of the present invention include microcapsules and micro-balloons. Exemplary micro-balloons include glass micro-balloons, silica micro-balloons, carbon micro-balloons, alumina micro-balloons, zirconia micro-balloons and volcanic ash micro-balloons, and plastic micro-balloons such as phenol resin micro-balloons and vinylidene chloride resin micro-balloons. Among these micro-balloons, elastic micro-balloons are preferred, and elastic micro-balloons of thermoplastic resins such as polymers of vinylidene chloride, acrylonitrile, methacrylonitrile, acrylates and methacrylates and copolymers of any of these thermoplastic resins are particularly preferred. The hollow filler typically has an average particle diameter of 5 to 200 μm, preferably 15 to 120 μm.

The hollow filler is typically blended in a proportion of 1 to 10 parts, preferably 2 to 5 parts, based on 100 parts of the urethane prepolymer.

In addition to the aforesaid components, a catalyst, a foaming agent, a surface active agent, a flame retardant, a coloring agent, a filler, a stabilizer, a release agent and the like may optionally be added to the urethane composition according to the present invention.

The urethane composition according to the present invention is prepared, for example, in the following manner. The polyether polyol blend (component (A)) containing PTMG and PPG in the predetermined weight ratio is degassed and dehydrated in vacuo under predetermined conditions (preferably at 80° C. for one hour). In turn, the resulting polyether polyol blend is mixed and reacted with the polyisocyanate (component (B)) in a nitrogen atmosphere under predetermined conditions (preferably at 80° C. for three hours) for preparation of the urethane prepolymer which has NCO groups at terminals thereof. Then, the chain lengthening agent (component (C)) is blended with the urethane prepolymer, whereby the intended urethane composition is provided. When an ion conductive agent, plasticizer, hollow filler and/or a like additive are to be blended therewith, the blending of these additives precedes the blending of the chain lengthening agent (component (C)) to provide the intended urethane composition.

Although the aforesaid prepolymerization method is preferred for the preparation of the urethane composition, the preparation method is not limited thereto. For example, a "one-shot process" may be employed in which all the components are mixed together at one time and cured, or a "semi-one-shot process" may be employed in which the polyether polyol blend (component (A)) is preliminarily separated into a polyol (A1) and another polyol (A2), for example, at a weight ratio of 1:1, and the polyol (A1) and the polyisocyanate (component (B)) are reacted for producing a prepolymer, and then the polyol (A2) and the chain lengthening agent (component (C)) are reacted with the prepolymer.

The urethane composition in a cured state is required to have a hardness of not smaller than 40, and a crosslinking density of 0.15 to 0.8 mmol/cm$^3$ or an allophanate bond concentration of 0.03 to 0.07 mmol/g.

If the hardness is lower than 40, the resulting roll tends to have an increased adhesion, so that paper dust is liable to adhere onto the roll thereby reducing the friction coefficient of the roll. The hardness is measured with a load of 9.8 N by means of a durometer of type A in accordance with Japanese Industrial Standard K 6253. If the crosslinking density is smaller than 0.15 mmol/cm$^3$, the abrasion resistance and compression resistance of the resulting roll tend to be deteriorated. If the crosslinking density is greater than 0.8 mmol/cm$^3$, the resulting roll tends not to have a high friction coefficient because of its high hardness. If the allophanate bond concentration is smaller than 0.03 mmol/g, the resulting roll tends to have a reduced abrasion resistance. If the allophanate bond concentration is greater than 0.07 mmol/g, the resulting roll tends not to have a high friction coefficient because of its high hardness.

It is particularly preferred that the urethane composition in the cured state has a hardness of 50 to 70, and a crosslinking density of 0.4 to 0.6 mmol/cm$^3$ or an allophanate bond concentration of 0.04 to 0.05 mmol/g.

The allophanate bond concentration is determined in the following manner. A 0.1-g specimen is cut out of a cured body of the urethane composition. Then, the specimen is immersed in 2 ml of an N-methyl pyrrolidone solution containing 0.01 mol/l of di-n-butylamine and 0.01 mol/l of naphthalene in a capped test tube, and decomposed at 80° C. for four hours. In turn, 10 $\mu$l of acetic anhydride and then 50 $\mu$l of di-n-propylamine are added to and mixed with the resulting decomposition products. Thereafter, the number of moles of di-n-butylacetamide in the resulting solution is determined under the following conditions through gas chromatography with naphthalene employed as an internal reference. A blank test is performed without the specimen to determine the number of moles of di-n-butylacetamide as a reference mole number. The allophanate bond concentration is determined on the basis of a difference between the mole number for the specimen and the reference mole number.

Conditions for Gas Chromatography

Gas chromatograph: Shimadzu GC-17A (Shimadzu Corp.)
Column: 10% PEG-20 M on Chromosorb WAW DMCS 60/80 mesh
(Gaschro Industries Ltd.) in a glass column of a size of 3 mm$\phi$×2 m
Column temperature: 50 to 350° C. (during temperature increase)

A sheet transport roll according to the present invention may have a construction such that a urethane elastomer layer 2 composed of the inventive urethane composition is provided on an outer periphery of a shaft 1 as shown in the FIGURE.

The shaft 1 is not particularly limited, but examples thereof include a solid metal shaft and a hollow cylindrical metal shaft. Exemplary materials for the shaft 1 include stainless steels, aluminum and plated iron. As required, an adhesive and/or a primer may be applied on the outer periphery of the shaft 1. As required, the adhesive and the primer may be conductive.

The sheet transport roll shown in the FIGURE is produced, for example, in the following manner. A mold for the sheet transport roll is prepared with the shaft 1 set therein, and then heated up to a predetermined temperature (preferably 140° C.). In turn, the urethane composition prepared in the aforesaid manner is poured into the mold, and allowed to undergo a curing reaction under predetermined conditions (preferably at 140° C. for 30 minutes). Then, the resulting cured body formed from the urethane composition is unmolded, and subjected to a secondary curing process under predetermined conditions (preferably at 110° C. for 12 hours), and the outer peripheral surface of the cured body is polished. Thus, a sheet transport roll is produced, which has the urethane elastomer layer 2 provided on the outer periphery of the shaft 1.

The urethane elastomer layer 2 of the sheet transport roll thus produced typically has a thickness of 1 to 8 mm, preferably 3 to 6 mm.

The urethane composition according to the present invention is advantageously employed for production of sheet transport rolls such as sheet feed rolls and transport rolls for copying machines, and may be employed for production of sheet transport belts and sheet transport rolls for vending machines, automatic ticket checkers, automatic teller machines, money changing machines, counting machines and cash dispensers.

Next, an explanation will be given for Examples of the present invention and for Comparative Examples.

Urethane prepolymers (A) to (J) and (a) to (j) employed in Examples and Comparative Examples were each prepared in the following manner. First, polyether polyol blends each containing PTMG and PPG in a proportion shown in Tables 1 to 3 were degassed and dehydrated in vacuo at 80° C. for one hour. Then, the resulting polyether polyol blends were each mixed with a polyisocyanate in a proportion shown in Tables 1 to 3 for reaction in a nitrogen atmosphere at 80° C.

for three hours. Thus, the urethane prepolymers were prepared which each had NCO groups at terminals thereof.

TABLE 1

| | Urethane prepolymer (parts) | | | | |
|---|---|---|---|---|---|
| | A | B | C | D | E |
| Polyether polyol blend | | | | | |
| PTMG*[1] | 75 | 90 | 60 | 99 | 50 |
| PPG*[2] | 25 | 10 | 40 | 1 | 50 |
| Polyisocyanate | | | | | |
| MDI | 32 | 32 | 32 | 32 | 32 |
| IPDI | — | — | — | — | — |

*[1]Mn = 2000
*[2]Mn = 2000

TABLE 2

| | Urethane prepolymer (parts) | | | | |
|---|---|---|---|---|---|
| | F | G | H | I | J |
| Polyether polyol blend | | | | | |
| PTMG*[1] | 75 | 90 | 60 | 99 | 50 |
| PPG*[2] | 25 | 10 | 40 | 1 | 50 |
| Polyisocyanate | | | | | |
| MDI | 33 | 33 | 33 | 33 | 33 |
| IPDI | — | — | — | — | — |

*[1]Mn = 2000
*[2]Mn = 2000

TABLE 3

| | Urethane prepolymer (parts) | | | | | | | | |
|---|---|---|---|---|---|---|---|---|---|
| | a | b | c | d | e | f | g | h | i |
| Polyether polyol blend | | | | | | | | | |
| PTMG*[1] | 100 | — | 75 | 75 | 75 | 45 | 100 | — | 45 |
| PPG*[2] | — | 100 | 25 | 25 | 25 | 55 | — | 100 | 55 |
| Polyisocyanate | | | | | | | | | |
| MDI | 32 | 32 | — | 23 | 42 | 32 | 33 | 33 | 33 |
| IPDI | — | — | 24 | — | — | — | — | — | — |

*[1]Mn = 2000
*[2]Mn = 2000

EXAMPLE 1

A mold for a sheet transport roll was prepared with a core metal shaft (composed of SUS304 and having a diameter of 10 mm) set therein, and heated up to 140° C. The urethane prepolymer (A) was degassed in vacuo at 90° C. for 30 minutes, and 3 parts of 1,4-butanediol (1,4-BD) and 2 parts of trimethylolpropane (TMP) were mixed with 100 parts of the urethane prepolymer under a reduced pressure for 2 minutes. Then, the resulting mixture was poured into the mold, and allowed to undergo a curing reaction at 140° C. for 30 minutes. In turn, the resulting cured body was unmolded, and subjected to a secondary curing process at 110° C. for 12 hours, and the outer peripheral surface of the cured body was polished. Thus, a sheet transport roll was produced, which had a urethane elastomer layer (having a thickness of 5 mm) provided on the outer periphery of the shaft.

EXAMPLES 2 TO 10 AND COMPARATIVE EXAMPLES 1 TO 6

Sheet transport rolls of Examples 2 to 10 and Comparative Examples 1 to 6 were produced in substantially the same manner as in Example 1, except that the urethane compositions each contained ingredients in the proportions as shown in Tables 4 to 6. In some of these examples, an ion conductive agent, a plasticizer or a hollow filler was preliminarily blended in the urethane prepolymers, which in turn were blended with a chain lengthening agent.

The sheet transport rolls of Examples 1 to 10 and Comparative Examples 1 to 6 thus produced were evaluated on the following criteria. The results are shown in Tables 4 to 6.

Hardness

The surface hardness of each of the sheet transport rolls was measured with a load of 9.8 N by means of a durometer of Type A in accordance with Japanese Industrial Standard K 6253.

Crosslinking Density

A urethane sample having a predetermined size was cut out of the urethane layer of each of the sheet transport rolls, and subjected to Soxhlet extraction at 80° C. for 15 hours. Then, the resulting urethane sample was dried in vacuo at room temperature (25° C.) for 15 hours. The resulting urethane sample was cut into a specimen having dimensions of 2 mm×2 mm×1 mm. The specimen was immersed in a solution containing toluene and tetrahydrofuran (THF) in a volume ratio of 1:1 at room temperature (25° C.) for 16 hours so as to be swelled. Then, a load was applied to the swelled specimen at a rate of 250 g/min at room temperature by means of a thermal mechanical analyzer (TMA-50 available from Shimadzu Corp.) for measuring compression stress, compression ratio and the ratio of heights before and after the swelling. The crosslinking density was calculated from the following equation (1) (Flory-Rhener theoretical equation) on the basis of the measurements thus obtained.

$$V=\tau/RT(\alpha-1/\alpha^2)\{(\xi^3-\emptyset)/(1-\emptyset)\}^{1/3} \quad (1)$$

wherein V is the crosslinking density, τ is the compression stress, T is an absolute temperature at which the measurement was conducted with the use of the thermal mechanical analyzer, α is the compression ratio, ξ is the ratio of the heights before and after the swelling, and ø is the amount of a filler (in this case, ø=0).

Friction Coefficient

The sheet transport rolls were each incorporated as a transport roll in a commercially available copying machine having an FRR (Feed and Reverse Roller) sheet feed system, and a sheet feed and transport durability test was performed. For each of the sheet transport rolls, the friction coefficient was measured, initially and after transportation of 500,000 paper sheets, at a circumferential speed of 200 mm/sec with a load of 2.9 N by means of a tester having a greater sheet curvature radius.

Abrasion Amount

For each of the sheet transport rolls, the diameter of a longitudinally middle portion thereof was measured by means of a laser scan micrometer initially and after transportation of 500,000 paper sheets, and the difference between the diameters thus measured was determined as an abrasion amount.

Transportation Ability

The sheet transport rolls were each incorporated as a transport roll in a commercially available copying machine having an FRR sheet feed system, and evaluated for transportation ability. In Tables 4 to 6, a symbol ○ indicates that neither sheet transportation failure nor overlapped sheet transportation occurred during transportation of 500,000 paper sheets, a symbol Δ indicates that sheet transportation failure or overlapped sheet transportation occurred during transportation of not less than 400,000 and less than 500,000 paper sheets, and a symbol×indicates that sheet transportation failure or overlapped sheet transportation occurred during transportation of less than 400,000 paper sheets.

TABLE 4

| | Examples (parts) | | | | | |
|---|---|---|---|---|---|---|
| | 1 | 2 | 3 | 4 | 5 | 6 |
| Urethane prepolymer | 100 | 100 | 100 | 100 | 100 | 100 |
| (Type) | A | B | C | A | A | A |
| Ion conductive agent*1 | — | — | — | 1 | — | — |
| Plasticizer*2 | — | — | — | — | 30 | — |
| Micro-capsules*3 | — | — | — | — | — | 3 |
| Chain lengthening agent | | | | | | |
| 1,4-BD | 3 | 3 | 3 | 3 | 3 | 3 |
| TMP | 2 | 2 | 2 | 2 | 2 | 2 |
| Hardness | 68 | 70 | 66 | 66 | 52 | 64 |
| Crosslinking density (mmol/cm$^3$) | 0.55 | 0.58 | 0.51 | 0.45 | 0.27 | 0.48 |
| Initial friction coefficient | 1.9 | 1.9 | 1.9 | 1.9 | 2 | 2 |
| Friction coefficient after durability test | 1.9 | 1.9 | 1.9 | 1.9 | 2 | 2 |
| Abrasion amount ($\mu$m) | 44 | 41 | 46 | 45 | 42 | 50 |
| Transportation ability | ○ | ○ | ○ | ○ | ○ | ○ |

*1Lithium perchlorate
*2DOP (dioctyl phthalate)
*3EXPANCEL 091DE80 (average particle diameter of 80 $\mu$m) available from Japan Fillite Co., Ltd.

TABLE 5

| | Examples (parts) | | | |
|---|---|---|---|---|
| | 6 | 7 | 8 | 9 |
| Urethane prepolymer | 100 | 100 | 100 | 100 |
| (Type) | A | A | D | E |
| Ion conductive agent*1 | 3 | — | — | — |
| Plasticizer*2 | — | 50 | — | — |
| Micro-capsules*3 | — | — | — | — |
| Chain lengthening agent | | | | |
| 1,4-BD | 3 | 3 | 3 | 3 |
| TMP | 2 | 2 | 2 | 2 |
| Hardness | 65 | 40 | 71 | 64 |
| Crosslinking density(mmol/cm$^3$) | 0.42 | 0.15 | 0.57 | 0.45 |
| Initial friction coefficient | 1.9 | 2 | 1.8 | 1.9 |
| Friction coefficient after durability test | 1.9 | 1.8 | 1.7 | 1.9 |
| Abrasion amount ($\mu$m) | 48 | 60 | 41 | 59 |
| Transportation ability | ○ | ○ | ○ | ○ |

*1Lithium perchlorate
*2DOP (dioctyl phthalate)
*3EXPANCEL 091DE80 (average particle diameter: 80 $\mu$m) available from Japan Fillite Co., Ltd.

TABLE 6

| | Comparative Examples (parts) | | | | | |
|---|---|---|---|---|---|---|
| | 1 | 2 | 3 | 4 | 5 | 6 |
| Urethane prepolymer | 100 | 100 | 100 | 100 | 100 | 100 |
| (Type) | a | b | c | d | e | f |
| Chain lengthening agent | | | | | | |
| 1,4-BD | 3 | 3 | 2.5 | 3 | 3.5 | 3 |
| TMP | 2 | 2 | 2 | 1.5 | 1.5 | 2 |
| Hardness | 72 | 65 | 37 | 45 | 80 | 62 |
| Crosslinking density (mmol/cm$^3$) | 0.58 | 0.4 | 0.16 | 0.11 | 0.85 | 0.4 |
| Initial friction coefficient | 1.5 | 1.8 | 1.9 | 1.9 | 1.6 | 1.8 |
| Friction coefficient after durability test | 1 | 1.5 | 0.6 | 1.9 | 1.6 | 1.5 |
| Abrasion amount ($\mu$m) | 40 | 101 | 149 | 174 | 20 | 85 |
| Transportation ability | Δ | x | x | x | x | Δ |

As can be understood from the above results, the sheet transport rolls of Examples 1 to 10 each had satisfactory hardness and crosslinking density, a high friction coefficient, excellent durability and a satisfactory transportation ability.

To the contrary, the sheet transport roll of Comparative Example 1 had a low friction coefficient, and was poor in durability and transportation ability, because PPG was not blended in the urethane prepolymer. The sheet transport roll of Comparative Example 2 was poor in abrasion resistance and transportation ability, because PTMG was not blended in the urethane prepolymer. The sheet transport roll of Comparative Example 3 had a significantly poor durability and a poor transportation ability, because the hardness was extremely low. The sheet transport roll of Comparative Example 4 had an extremely great abrasion amount and a poor transportation ability, because the crosslinking density was extremely low. The sheet transport roll of Comparative Example 5 had an extremely high hardness, a low friction coefficient and a poor transportation ability, because the crosslinking density was extremely high. The sheet transport roll of Comparative Example 6 was poor in durability and transportation ability, because the PPG blending ratio was extremely high.

EXAMPLES 11 TO 21 AND COMPARATIVE EXAMPLES 7 TO 12

Sheet transport rolls of Examples 11 to 21 and Comparative Examples 7 to 12 were each produced in substantially the same manner as in Example 1, except that the urethane compositions each containing ingredients in proportions as shown in Tables 7 to 9 were employed. In some of these examples, an ion conductive agent, a plasticizer or a hollow filler was preliminarily blended in urethane prepolymers, which were in turn blended with a chain lengthening agent.

The sheet transport rolls of Examples 11 to 21 and Comparative Examples 7 to 12 thus produced were evaluated on the criteria described above and below. The results are shown in Tables 7 to 9.

Allophanate Bond Concentration

A specimen was cut out of a urethane layer of each of the sheet transport rolls, and an allophanate bond concentration in the specimen was measured in the aforesaid manner.

TABLE 7

| | Examples | | | | | (parts) |
|---|---|---|---|---|---|---|
| | 11 | 12 | 13 | 14 | 15 | 16 |
| Urethane prepolymer | 100 | 100 | 100 | 100 | 100 | 100 |
| (Type) | F | G | H | F | F | F |
| Ion conductive agent*[1] | — | — | — | 1 | — | — |
| Plasticizer*[2] | — | — | — | — | 30 | — |
| Micro-capsules*[3] | — | — | — | — | — | 3 |
| Chain lengthening agent | | | | | | |
| 1,4-BD | 3 | 3 | 3 | 3 | 3 | 3 |
| TMP | 2 | 2 | 2 | 2 | 2 | 2 |
| Hardness | 69 | 71 | 67 | 67 | 53 | 65 |
| Crosslinking density (mmol/cm$^3$) | 0.05 | 0.05 | 0.05 | 0.05 | 0.04 | 0.05 |
| Initial friction coefficient | 1.9 | 1.8 | 1.9 | 1.9 | 2 | 2 |
| Friction coefficient after durability test | 1.9 | 1.8 | 1.9 | 1.9 | 2 | 2 |
| Abrasion amount ($\mu$m) | 42 | 41 | 44 | 43 | 42 | 49 |
| Transportation ability | ○ | ○ | ○ | ○ | ○ | ○ |

*[1]Lithium perchlorate
*[2]DOP (dioctyl phthalate)
*[3]EXPANCEL 091DE80 (average particle diameter of 80 $\mu$m) available from Japan Fillite Co., Ltd.

TABLE 8

| | Examples | | | | (parts) |
|---|---|---|---|---|---|
| | 17 | 18 | 19 | 20 | 21 |
| Urethane prepolymer | 100 | 100 | 100 | 100 | 100 |
| (Type) | F | F | I | J | F |
| Ion conductive agent*[1] | 3 | — | — | — | — |
| Plasticizer*[2] | — | 50 | — | — | — |
| Micro-capsules*[3] | — | — | — | — | — |
| Chain lengthening agent | | | | | |
| 1,4-BD | 3 | 3 | 3 | 3 | 2.6 |
| TMP | 2 | 2 | 2 | 2 | 1.6 |
| Hardness | 66 | 40 | 71 | 65 | 75 |
| Allophanate bond concentration (mmol/g) | 0.05 | 0.03 | 0.05 | 0.05 | 0.07 |
| Initial friction coefficient | 1.9 | 2 | 1.8 | 1.9 | 1.8 |
| Friction coefficient after durability test | 1.9 | 1.8 | 1.7 | 1.9 | 1.7 |
| Abrasion amount ($\mu$m) | 47 | 59 | 40 | 57 | 24 |
| Transportation ability | ○ | ○ | ○ | ○ | ○ |

*[1]Lithium perchlorate
*[2]DOP (dioctyl phthalate)
*[3]EXPANCEL 091DE80 (average particle diameter of 80 $\mu$m) available from Japan Fillite Co., Ltd.

TABLE 9

| | Comparative Examples | | | | | (parts) |
|---|---|---|---|---|---|---|
| | 7 | 8 | 9 | 10 | 11 | 12 |
| Urethane prepolymer | 100 | 100 | 100 | 100 | 100 | 100 |
| (Type) | g | h | c | d | e | i |
| Chain lengthening agent | | | | | | |
| 1,4-BD | 3 | 3 | 2.5 | 3 | 3.5 | 3 |
| TMP | 2 | 2 | 2 | 1.5 | 1.5 | 2 |
| Hardness | 73 | 66 | 37 | 45 | 80 | 63 |
| Allophanate bond concentration (mmol/g) | 0.05 | 0.05 | 0 | 0 | 0.08 | 0.05 |
| Initial friction coefficient | 1.5 | 1.8 | 1.9 | 1.9 | 1.6 | 1.8 |

TABLE 9-continued

| | Comparative Examples | | | | | (parts) |
|---|---|---|---|---|---|---|
| | 7 | 8 | 9 | 10 | 11 | 12 |
| Friction coefficient after durability test | 1 | 1.4 | 0.6 | 1.9 | 1.6 | 1.5 |
| Abrasion amount ($\mu$m) | 39 | 100 | 149 | 174 | 20 | 83 |
| Transportation ability | Δ | x | x | x | x | Δ |

As can be understood from the above results, the sheet transport rolls of Examples 11 to 21 each had a high friction coefficient, excellent durability and a satisfactory transportation ability, because the hardness and the allophanate bond concentration were controlled to be in the predetermined ranges.

To the contrary, the sheet transport roll of Comparative Example 7 had a low friction coefficient, and was poor in durability and transportation ability, because PPG was not blended in the urethane prepolymer. The sheet transport roll of Comparative Example 8 was poor in abrasion resistance and transportation ability, because PTMG was not blended in the urethane prepolymer. The sheet transport roll of Comparative Example 9 had a significantly poor durability and a poor transportation ability, because the hardness and the allophanate bond concentration were extremely low. The sheet transport roll of Comparative Example 10 had an extremely great abrasion amount and a poor transportation ability, because the allophanate bond concentration was extremely low. The sheet transport roll of Comparative Example 11 had a low friction coefficient and a poor transportation ability, because the allophanate bond concentration was extremely high. The sheet transport roll of Comparative Example 12 was poor in durability and transportation ability, because the PPG blending ratio was extremely high.

As described above, the urethane composition for the sheet transport roll according to the present invention comprises the polyether polyol blend (component (A)) containing PTMG and PPG in the predetermined weight ratio, the polyisocyanate (component (B)) and the chain lengthening agent (component (c)), and has, in the cured state, a hardness in the predetermined range, and a crosslinking density in the predetermined range or an allophanate bond concentration in the predetermined range. Therefore, the sheet transport roll produced by employing the urethane composition has a high friction coefficient and an excellent abrasion resistance, and maintains the friction coefficient at a high level.

When the urethane composition includes the ion conductive agent in addition to the polyether polyol blend (component (A)), the polyisocyanate (component (B)) and the chain lengthening agent (component (C)), the ion conductive agent serves as an anti-static agent, so that paper dust can more effectively be prevented from adhering on a roll surface and the friction coefficient of the roll can more effectively be maintained at a high level.

Where the urethane composition comprises a plasticizer and/or a hollow filler in addition to the components (A) to (C), the friction coefficient advantageously can be increased.

What is claimed is:
1. A urethane composition for preparing a sheet transport roll for use in a copying machine, the composition comprising: (A) a polyether polyol blend containing polytetramethyleneether glycol (PTMG) end polypropylene glycol (PPG) in a weight ratio of PTMG/PPG=99/1 to 50/50; (B) a polyisocyanates; and (C) a chain lengthening agent, the urethane composition in a cured state having a hardness of not smaller than 40, and a crosslinking density of 0.15 to 0.8 mmol/cm$^3$ or an allophanate bond concentration of 0.03 to 0.07 mmol/g.

2. A urethane composition as set forth is claim 1, further comprising an ion conductive agent.

3. A urethane composition as set forth in claim 1, further comprising a plasticizer.

4. A urethane composition as set forth in claim 2, further comprising a plasticizer.

5. A urethane composition as set forth in claim 1, further comprising a hollow filler.

6. A urethane composition as set forth in claim 2, further comprising a hollow filler.

7. A urethane composition as set forth in claim 3, further comprising a hollow filler.

8. A urethane composition as set forth in claim 4, further comprising a hollow filler.

9. A sheet transport roll comprising a urethane composition as recited in claim 1 in a cured state.

10. A sheet transport roll comprising a urethane composition as recited in claim 2 in a cured state.

11. A sheet transport roll comprising a urethane composition as recited in claim 3 in a cured state.

12. A sheet transport roll comprising a urethane composition as recited in claim 4 in a cured state.

13. A sheet transport roll comprising a urethane composition as recited in claim 5 in a cured state.

14. A sheet transport roll comprising a urethane composition as recited in claim 6 in a cured state.

15. A sheet transport roll comprising a urethane composition as recited in claim 7 in a cured state.

16. A sheet transport roll comprising a urethane composition as recited in claim 8 in a cured state.

17. A sheet transport roll for use in a copying machine comprising; a shaft; and a urethane layer provided on an outer periphery of the shaft, the urethane layer being composed of a urethane composition in a cured state prepared from: (A) a polyether polyol blend containing polytetramethyleneether glycol (PTMG) and polypropylene glycol (PPG) in a weight ratio of PTMG/PPG=99/1 to 50/50; (B) a polyisocyanate; and (C) a chain lengthening agent; the urethane composition in a cured state having a hardness of 40 to 67 as measured with a load of 9.8 N by means of a durometer of Type A in accordance with Japanese Industrial Standard K 6253, and a crosslinking density of 0.15 to 0.8 mmol/cm$^3$ or an allophanate bond concentration of 0.03 to 0.07 mmol/g.

\* \* \* \* \*

UNITED STATES PATENT AND TRADEMARK OFFICE
CERTIFICATE OF CORRECTION

PATENT NO.        : 6,734,274 B2  
APPLICATION NO. : 09/940787  
DATED              : May 11, 2004  
INVENTOR(S)      : Suzuki et al.

It is certified that error appears in the above-identified patent and that said Letters Patent is hereby corrected as shown below:

Column 12:
in claim 1 on line 66 change, "glycol (PTMG) end polypropylene ...." to be -- glycol (PTMG) and polypropylene .... --

Column 13:
in claim 1 on line 1 change, "polyisocyanates; and" to be -- polyisocyanate; and ....-- also in claim 1 on line 2 and 3 change, "a harness of not smaller than 40 and a crosslinking ...." a hardness of 40 to 67 as measured with a load of 9.8 N by means of a durometer of Type A in accordance with Japanese Industrial Standard K 6253, and a crosslinking .... --

Signed and Sealed this

Twenty-seventh Day of March, 2007

JON W. DUDAS  
*Director of the United States Patent and Trademark Office*